(12) United States Patent
Downs et al.

(10) Patent No.: US 11,578,707 B1
(45) Date of Patent: Feb. 14, 2023

(54) SHAPE MEMORY ALLOY ENCLOSURE FOR NON-EVAPORABLE GETTERS

(71) Applicant: Honeywell International Inc., Charlotte, NC (US)

(72) Inventors: John Downs, Morristown, NJ (US); Mahdi Mohajeri, Morristown, NJ (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/732,295

(22) Filed: Apr. 28, 2022

(51) Int. Cl.
  *F03G 7/06* (2006.01)
(52) U.S. Cl.
  CPC .................................. *F03G 7/0614* (2021.08)
(58) Field of Classification Search
  CPC ....................................................... F03G 7/0614
  USPC .................................................. 50/526–528
  See application file for complete search history.

(56) References Cited

U.S. PATENT DOCUMENTS

| | | | |
|---|---|---|---|
| 5,191,980 A | 3/1993 | Boffito et al. | |
| 6,309,184 B1 | 10/2001 | Moraja et al. | |
| 6,992,442 B2 | 1/2006 | Touchberry et al. | |
| 7,781,743 B2 | 8/2010 | Katagiri et al. | |
| 2010/0011783 A1* | 1/2010 | Aoki | F04B 37/08 62/55.5 |
| 2020/0181013 A1 | 6/2020 | Ishibashi et al. | |

FOREIGN PATENT DOCUMENTS

| | | |
|---|---|---|
| CN | 100400790 C | 7/2008 |
| CN | 105504712 B | 5/2018 |
| CN | 208330655 U | 1/2019 |
| JP | S63257170 A | 10/1988 |
| JP | 2008200616 A | 9/2008 |
| WO | 2003043904 A1 | 5/2003 |
| WO | 2015036752 A2 | 3/2015 |

* cited by examiner

*Primary Examiner* — Shafiq Mian
(74) *Attorney, Agent, or Firm* — Fogg & Powers LLC

(57) ABSTRACT

A method for using a shape memory alloy (SMA) with a non-evaporable getter (NEG) employed in a vacuum device is disclosed. The method comprises coupling a NEG component to a SMA component to form an NEG/SMA assembly pair; heating the NEG/SMA assembly pair to activate the NEG component; and packaging the activated NEG component with the SMA component to form an NEG/SMA package having a gas tight seal. The method further comprises installing the NEG/SMA package in the vacuum device; and heating the installed NEG/SMA package such that the SMA component is actuated to expose the activated NEG component to a vacuum chamber in the vacuum device.

20 Claims, 3 Drawing Sheets

SHAPE MEMORY ALLOY ENCLOSURE FOR NON-EVAPORABLE GETTERS

BACKGROUND

In high vacuum electric devices, a getter is used to maintain the vacuum level over time as the high voltage electronics release gases over the device life and from gas permeation of the device container, like oxygen and nitrogen. In the case of laser devices, a getter is used to maintain the purity of excitation gas and avoid the loss of the laser signal.

Typically, a barium-based evaporable getter is used to deposit a barium film inside the device after it has been pumped to high vacuum. The deposited film is formed by flashing an installed getter pan using radio frequency (RF) induction. This heats the getter pan to a point where the material in the getter pan reacts, with barium metal evaporating and condensing on nearby cold surfaces.

In certain devices, the RF induction from the flash can also cause heating in other nearby metal components, like indium vacuum seals. Indium has a low melting temperature, so if the flash is not done quick enough, or the getter and seals are too close to the getter pan being flashed, the seals will melt and vacuum will be lost in the device. The device then needs to either be reworked or scrapped.

One option to get avoid the RF-heating is the use of a non-evaporable getter (NEG). These getters function off the oxidation of metals like titanium, zirconium, and aluminum. However, rather than being flashed, these getters must be activated. This requires heating the NEG (an in most cases the entire device) after NEG installation to several hundred degrees for an extended period of time, to reduce the active metals so they are ready to pump. Because of the temperatures required for NEG activation, other temperature sensitive components like indium seals are, again, a failure point.

There are methods available to cause local heating in a vacuum device. The simplest method is through resistive heating of an evaporable getter pan or NEG support. However, the wires used for heating need to pass through the vacuum container and present an additional area that needs to be sealed for vacuum. In other methods, lasers can be used for local heating in a vacuum device. However, the laser only activates small areas of the getter and is unable to take advantage of the highly porous surface of a typical NEG.

SUMMARY

A method for using a shape memory alloy (SMA) with a non-evaporable getter (NEG) employed in a vacuum device is disclosed. The method comprises coupling a NEG component to a SMA component to form an NEG/SMA assembly pair; heating the NEG/SMA assembly pair to activate the NEG component; and packaging the activated NEG component with the SMA component to form an NEG/SMA package having a gas tight seal. The method further comprises installing the NEG/SMA package in the vacuum device; and heating the installed NEG/SMA package such that the SMA component is actuated to expose the activated NEG component to a vacuum chamber in the vacuum device.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
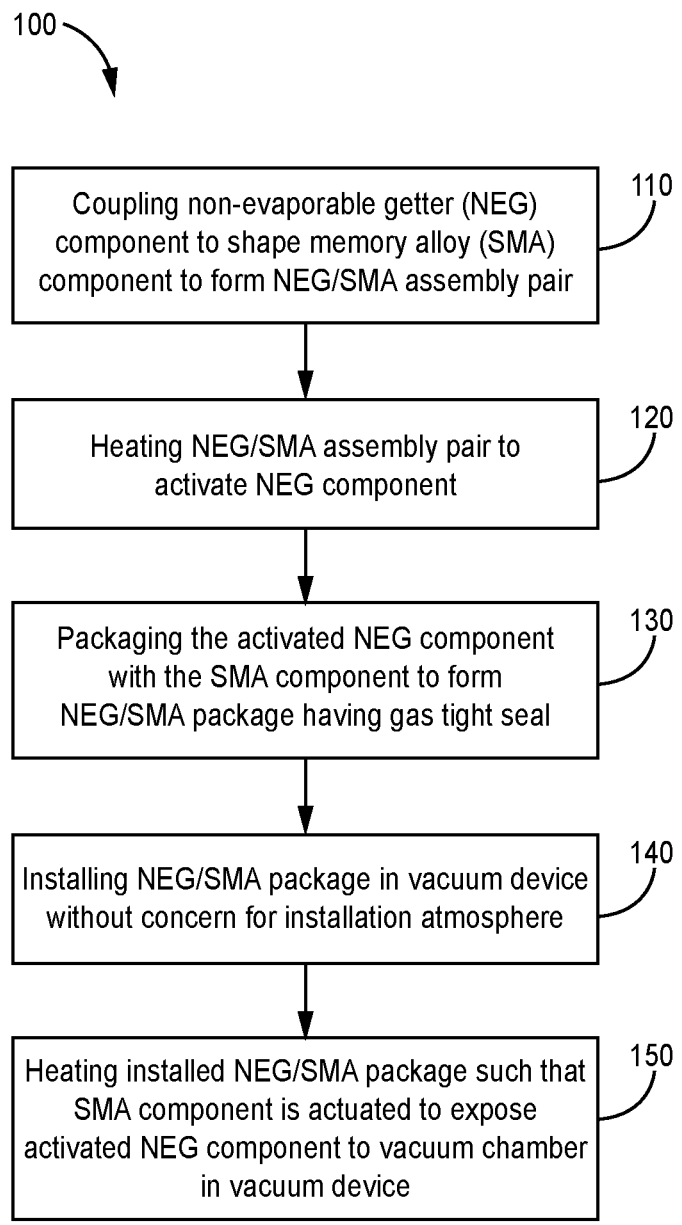
FIG. 1 is a flow diagram of a method for fabricating an enclosure for a non-evaporable getter (NEG) for a vacuum device, according to one implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An approach for producing shape memory alloy enclosures for non-evaporable getters, which are employed in vacuum devices, is described herein.

In the present approach, activation of a non-evaporable getter is done separately from a vacuum device. Once activated, the non-evaporable getter is sealed in a shape memory alloy enclosure to allow installation of the getter into the vacuum device without oxidation. After installation, minimal heating can be used to open the shape memory alloy enclosure and expose the getter to the vacuum device environment without affecting any heat sensitive parts.

A wide range of shape memory alloys can be chosen that have desired properties, such as control activation temperature and solderability. For example, the shape memory alloy can be selected to be actuated (opened) at a low enough temperature so that seals in the vacuum device are not at risk. The shape memory alloy will go through large deformation upon heating, which means a brazed or soldered edge of a shape memory alloy enclosure will open and the non-evaporable getter will be exposed. In some embodiments, an off-the-shelf non-evaporable getter can be selected that has the desired pumping and capacity characteristics for use in a particular vacuum device.

The present approach also does not require additional pass throughs for the vacuum device, which can cause loss of vacuum or increased gas leakage. The present technique also allows for taking advantage of the entire surface area of the non-evaporable getter when in use.

Non-Evaporable Getters

Non-evaporable getters (NEGs) help to establish and maintain a vacuum by soaking up or bonding to gas molecules that remain within a partial vacuum. This is done through the use of alloy materials that readily form stable compounds with active gases. Non-evaporable getter materials are mostly porous alloys or powder mixtures of aluminum, zirconium, titanium, vanadium, iron, or cobalt.

Common NEG alloys can be employed with the present methods and have names of the form St (Stabil) followed by a number. Some commercially available NEGs include: St 707 (70% zirconium, 24.6% vanadium, and balance iron); St 787 (80.8% zirconium, 14.2% cobalt, and balance mischmetal (alloy of rare-earth elements)); and St 101 (84% zirconium, and 16% aluminum).

Shape-Memory Alloys

Shape-memory alloys (SMAs) include alloy materials that can be deformed when cold but return to pre-deformed ("remembered") shapes when heated. For example, when a shape-memory alloy is in a cold state, the alloy can be bent or stretched to a desired shape, and will hold this shape until heated above a transition temperature. Upon heating, the shape of the alloy changes back to its original form. When the alloy is cooled again, it will retain the original form until deformed again. Different classes of SMAs include low and high temperature SMAs; and one-way or two-way SMAs. The one-way or two-way SMAs provide a good window to have the SMA actuation step at a low enough temperature that a high temperature, vacuum adhesive can be employed for adhering the NEG to the SMA.

A variety of alloys exhibit the shape-memory effect, and alloying constituents can be adjusted to control the transformation temperatures of the SMA. The SMAs can exist in two different phases, with three different crystal structures (i.e., twinned martensite, detwinned martensite, and austenite) and six possible transformations. The transition from the martensite phase to the austenite phase is only dependent on temperature and stress, not time, as there is no diffusion involved. It is the reversible diffusionless transition between these two phases that results in the special properties of SMAs. For example, various SMA alloys change from austenite to martensite upon cooling. In a one-way SMA, cooling from a high temperatures does not cause a macroscopic shape change. A deformation is necessary to create a low temperature shape. Upon heating, transformation back to the original shape of the SMA occurs.

Further details related to the present approach are described as follows and with reference to the drawings.

FIG. 1 is a flow diagram of a method 100 for fabricating an enclosure for a non-evaporable getter (NEG) for a vacuum device, according to one example implementation. The method 100 initially includes coupling a NEG component to a shape memory alloy (SMA) component to form an NEG/SMA assembly pair (block 110). The NEG component and the SMA component can be composed of various alloy materials, which are described in further detail hereafter.

In the next step of method 100, heating of the NEG/SMA assembly pair is performed in order to activate the NEG component (block 120). The heating of the NEG/SMA assembly pair can be done in a variety of ways and at a variety of temperatures, depending on the NEG and SMA materials. For example, the NEG/SMA pair can be placed in a vacuum oven, and heated to an activation temperature of the NEG component. Next, method 100 includes packaging the activated NEG component with the SMA component to form an NEG/SMA package having a gas tight seal (block 130). The packaging stage can take place in an inert atmosphere, such as argon.

The NEG/SMA package can then be installed in the vacuum device without concern for the installation atmosphere (block 140). The final step of method 100 includes heating the installed NEG/SMA package such that the SMA component is actuated to expose the activated NEG component to a vacuum chamber in the vacuum device (block 150). For example, a low temperature oven can be employed that is hot enough to actuate the SMA component to expose the NEG component, but cool enough to avoid issues with other heat sensitive components like the seals in the vacuum device. In the special case based on design constraint, the SMA component can be heated to a temperature to achieve partial actuation and expose part of the NEG component.

The NEG component can be selected from various alloy materials, such as zirconium-vanadium-iron (Zr—V—Fe), zirconium-cobalt-mischmetal (Zr—Co-mischmetal), zirconium-aluminum (Zr-AI), zirconium-vanadium-titanium-aluminum (Zr—V—Ti-AI), various combinations thereof, or the like.

The SMA component can be selected from various alloy materials, such as nickel-titanium-hafnium (Ni—Ti—Hf), nickel-titanium-zirconium (Ni—Ti—Zr), titanium-nickel-palladium (Ti—Ni—Pd), titanium-nickel-platinum (Ti—Ni—Pt), copper-aluminum-niobium (Cu—Al—Nb), copper-aluminum-nickel (Cu—Al—Ni), cobalt-aluminum (Co—Al), cobalt-nickel-aluminum (Co—Ni-AI), nickel-aluminum (Ni-AI), nickel-manganese (Ni—Mn), nickel-manganese-gallium (Ni—Mn—Ga), zirconium-copper (Zr—Cu), titanium-niobium (Ti—Nb), uranium-niobium (U—Nb), titanium-palladium (Ti—Pd), titanium-gold (Ti—Au), titanium-platinum-iridium (Ti—Pt—Ir), tantalum-ruthenium (Ta—Ru), niobium-ruthenium (Nb—Ru), various combinations thereof, or the like.

The NEG component and the SMA component can have various shapes and sizes. For example, the NEG component can be a getter powder formed into tablets; a getter powder attached (e.g., cold welded) to or coated on a metal strip; a ring getter, either with or without a support; or combinations thereof. The SMA component can be formed as a ring, a foil, a wire, a ribbon, a strip, a tube, or the like.

The NEG component can be coupled to the SMA component by various techniques, such as by soldering, brazing, vacuum adhesives, or the like. In one embodiment, the NEG material can be deposited on an SMA surface with solid state weld methods, such as ultrasonic welding or cold welding.

The activation temperature and time can vary depending on the getter material. The NEG/SMA assembly pair can be heated in an oven, by radio frequency (RF) induction, or the like. In one embodiment, the NEG/SMA assembly pair can be heated to a temperature from about 400° C. to about 950° C. under vacuum, for a time of less than about 1 minute to about 150 minutes, to activate the NEG component.

The vacuum device where the NEG/SMA package is installed can be a ring laser gyroscope, an electron microscope, an e-beam lithography device, a vacuum tube, a metal vapor lamp, or the like. In one embodiment, the installed NEG/SMA package can be heated to a temperature from about 100° C. to about 500° C., for a time of less than about 1 minute to about 10 minutes, such that the SMA component is actuated to expose the activated NEG component to the vacuum chamber. The installed NEG/SMA package can be heated in an oven, by RF induction, or the like.

Figure 2:
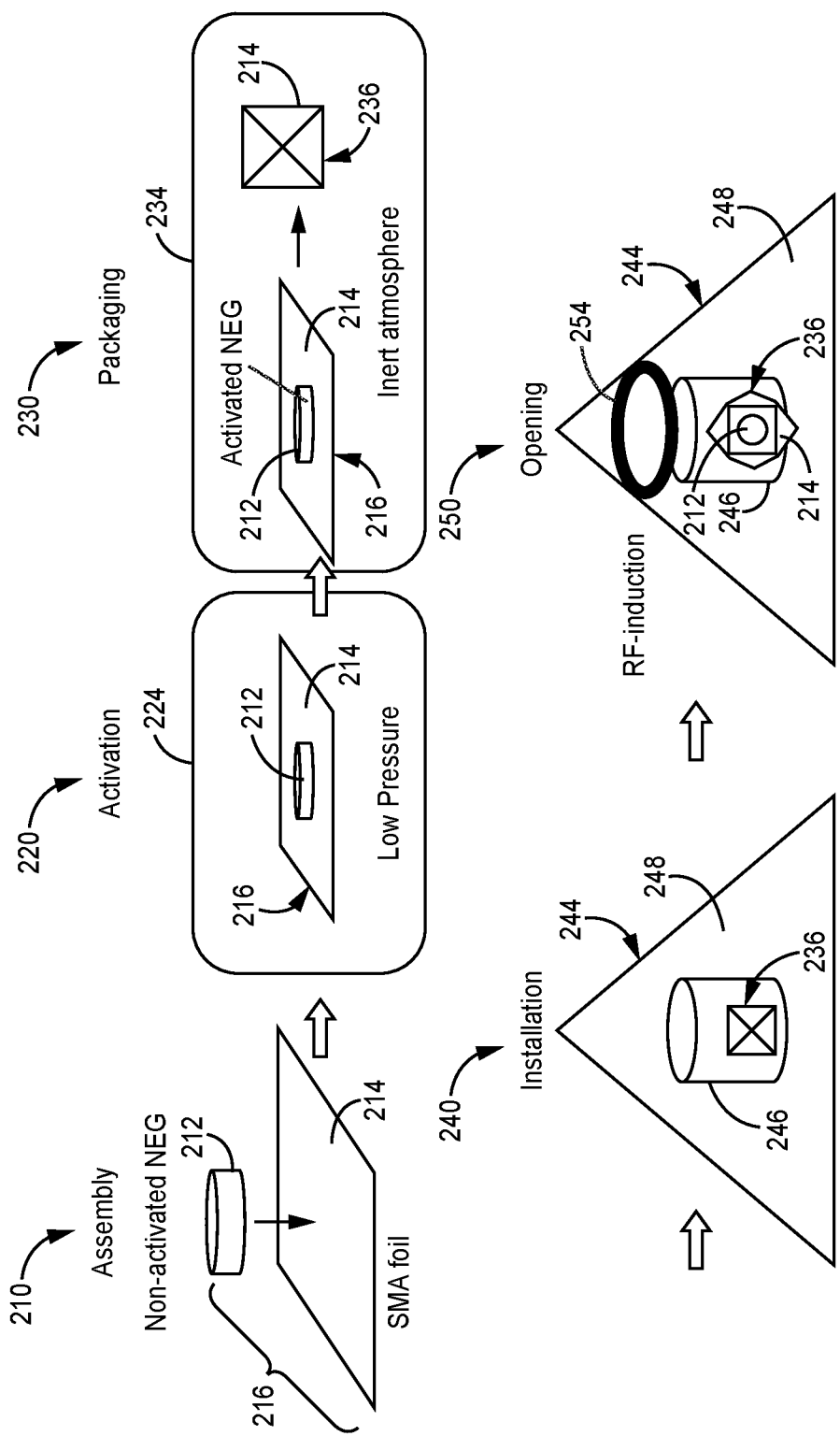
FIG. 2 schematically illustrates a method of manufacturing a shape memory alloy enclosure for a non-evaporable getter, which is installed in a vacuum electric device, according to one exemplary approach.

FIG. 2 illustrates a method of manufacturing a shape memory alloy enclosure for a NEG, which is installed in a vacuum device, according to one exemplary approach. Initially, during an assembly stage 210, a non-activated NEG component 212 is attached to a SMA foil 214 to form an NEG/SMA assembly pair 216.

Next, during an activation stage 220, NEG/SMA assembly pair 216 is heated to activate the NEG material of NEG component 212. For example, NEG/SMA assembly pair 216 can be heated in an oven 224 at a temperature from about 200° C. to about 600° C., under low pressure (e.g., vacuum), to activate the NEG material. Thereafter, during a packaging stage 230, NEG/SMA assembly pair 216 is placed in a cooling chamber 234 having an inert atmosphere (e.g., nitrogen or argon). There, SMA foil 214 is folded around the activated NEG material of NEG component 212 to produce a NEG/SMA package 236, with the activated NEG material enclosed by the folded SMA foil 214 in a gas tight seal.

During an installation stage 240, NEG/SMA package 236 is installed in a vacuum electric device 244, such as a ring laser gyroscope. For example, NEG/SMA package 236 can be placed in a getter well 246 that is positioned within a vacuum chamber 248 of vacuum electric device 244. In a final opening stage 250, the installed NEG/SMA package 236 is heated, such as by RF-induction using an induction coil 254. This actuates the SMA material of NEG/SMA package 236, such that SMA foil 214 unfolds and exposes the activated NEG material of NEG component 212 in vacuum electric device 244. Alternatively, a low temperature oven (e.g., at about 100-120° C.) can be employed that is hot enough to actuate the SMA material, but cool enough to avoid interfering with other heat sensitive components in vacuum electric device 244, such as seals in the case of a ring laser gyroscope.

The SMA foil 214 can be selected such that it will return to its original shape (flat shape before packaging) after heating to a temperature that is higher than the maximum operating temperature of vacuum electric device 244 (e.g., ring laser gyroscope), but low enough to allow sufficient inductive heating to occur without melting the seals (e.g., indium seals) in vacuum electric device 244. Since SMA foil 214 will be actuated one time for this application, a low cost SMA with large strain and recovery (e.g., Cu—Al—Ni) can be used where the alloy has good solderability.

Figure 3:
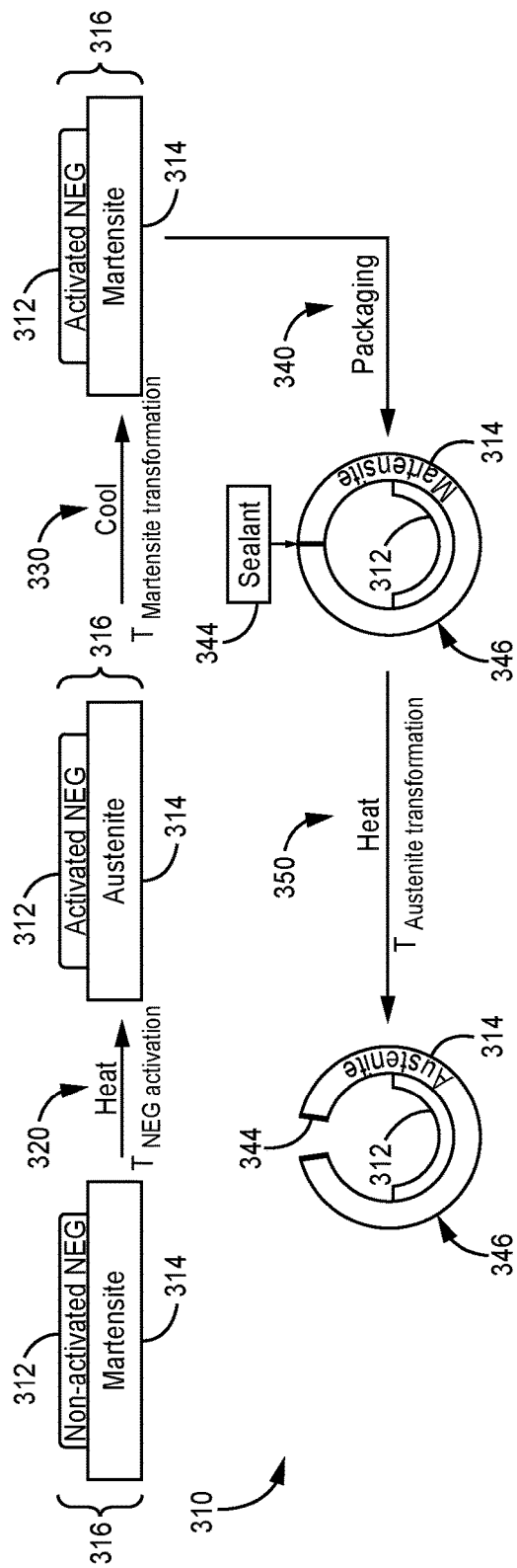
FIG. 3 schematically illustrates a fabrication sequence for producing a shape memory alloy container for a non-evaporable getter, according to one example.

FIG. 3 illustrates a fabrication sequence 310 for producing a container for a NEG material using a one-way SMA, according to one example. The one-way SMA is used as a holder/packaging component for the NEG material and seals the activated getter.

Initially, in fabrication sequence 310, a NEG component 312 with a non-activated NEG material is coupled to a SMA holder 314 having a one-way SMA material, to form an NEG/SMA assembly pair 316. At this stage, the one-way SMA material of SMA holder 314 is in martensite form. Next, the NEG/SMA assembly pair 316 is heated (under vacuum) to a NEG activation temperature ($T_{NEG\ activation}$), such as from 450° C. to 500° C., as indicated at 320. This results in an activated NEG material of NEG component 312, and a phase transformation of the one-way SMA material of SMA holder 314 to austenite. The activation of the NEG material and phase transformation of the one-way SMA material to austenite happens at the same time, based on the following temperature expression:

$$T_{NEG\ activation} > T_{Austenite\ transformation\ start}.$$

The activated NEG material and one-way SMA material (austenite phase) of NEG/SMA assembly pair 316 are then cooled down (under vacuum) to a martensite transformation temperature ($T_{Martensite\ transformation}$), such as from −20° C. to 150° C., as indicted at 330. This transforms the austenite phase of the one-way SMA material back to martensite for SMA holder 314.

In a packaging stage of fabrication sequence 310 as indicated at 340, SMA holder 314 is then deformed to a desired container shape (under vacuum or argon atmosphere) to enclose the activated NEG material of NEG component 312. A sealant 344 can then be applied to seal the deformed SMA holder 314 (under vacuum) to produce a sealed NEG/SMA package 346. For example, sealant 344 can be various brazing materials. The sealant 344 is selected to have a softening or melting temperature ($T_{Sealant\ softening\backslash melting}$) that is less than the austenite transformation start temperature ($T_{Austenite\ transformation\ start}$).

The sealed NEG/SMA package 346 is then heated up to the austenite transformation start temperature as indicated at 350. A strain induced during the phase transformation of the martensite of SMA holder 314 back to austenite breaks sealant 344 such that NEG/SMA package 346 is opened. This leaves the activated NEG material of NEG component 312 exposed while remaining inside SMA holder 314.

Figure 4:
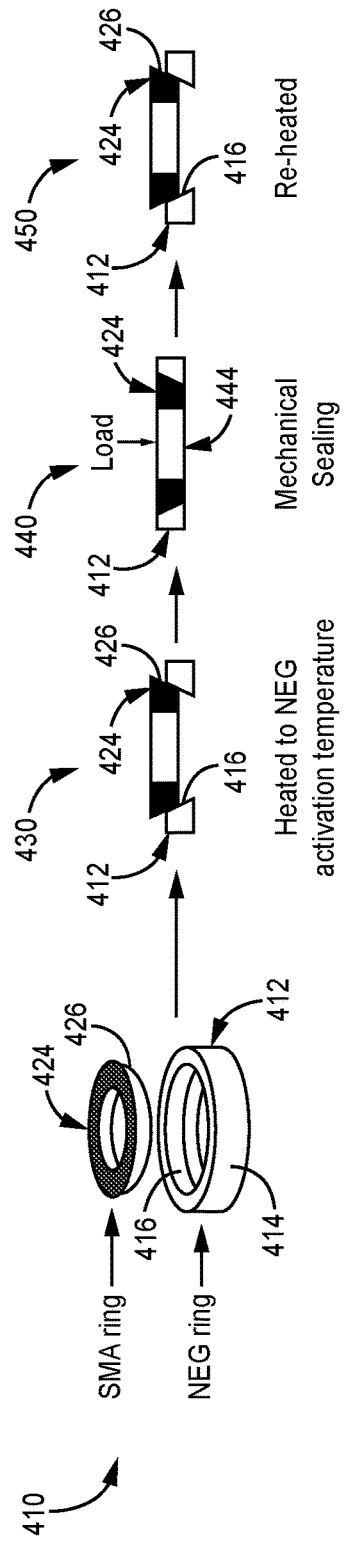
FIG. 4 schematically illustrates a fabrication sequence for using a ring-shaped shape memory alloy as a sealing component for a ring-shaped non-evaporable getter, according to another example.

FIG. 4 illustrates a fabrication sequence 410 for using a ring-shaped SMA as a sealing component for a ring-shaped NEG, according to another example. Initially, in fabrication sequence 410, a NEG ring 412 with a non-activated NEG material is provided along with an SMA ring 424 having a SMA material in martensite form. The NEG ring 412 has a first diameter, and SMA ring 424 has a second diameter that is less than the first diameter.

In one example, NEG ring 412 can include a Zr—V—Fe getter alloy, with an outer diameter (OD) of 0.9 mm and an inner diameter (ID) of 0.6 mm. The NEG ring 412 can have an outer surface 414 composed of a non-getter material, and a beveled inner surface 416 coated with the getter material. The SMA ring 424 can include a Ni—Ti—Hf alloy, with an OD of about 0.9 mm, and an ID of about 0.6 mm. The SMA ring 424 has a beveled outer surface 426 that is configured to engage with beveled inner surface 416 of NEG ring 412 as described hereafter.

Next, fabrication sequence 410 includes placing SMA ring 424 over NEG ring 412, so that beveled outer surface 426 of SMA ring 424 slides partially along beveled inner surface 416 of NEG ring 412, as indicated at 430. At this stage, NEG ring 412 and SMA ring 424 are heated to the NEG activation temperature. For example, when NEG ring 412 includes a Zr—V—Fe getter alloy, NEG ring 412 and SMA ring 424 are heated to a NEG activation temperature of about 500° C. This results in a phase transformation of SMA ring 414 to austenite, since the NEG activation temperature ($T_{NEG\ activation}$) is greater that the austenite transformation start temperature ($T_{Austenite\ transformation\ start}$).

Thereafter, SMA ring 424 is expanded by applying a load thereon as indicated at 440. This causes SMA ring 424 to couple into NEG ring 412, such that beveled outer surface 426 of SMA ring 424 completely covers beveled inner surface 416 of NEG ring 412, as shown at 440. This produces a sealed NEG/SMA package 444, which provides mechanical sealing for the getter material coated on inner surface 416 of NEG ring 412. When the sealed NEG/SMA package 444 is reheated (e.g., less than about 157° C.), SMA ring 424 reverts back to its original shape, causing beveled outer surface 426 of SMA ring 424 to slide back up beveled inner surface 416 of NEG ring 412. This exposes the getter material coated on inner surface 416, as indicated at 450.

EXAMPLE EMBODIMENTS

Example 1 includes a method comprising: coupling a non-evaporable getter (NEG) component to a shape memory alloy (SMA) component to form an NEG/SMA assembly pair; heating the NEG/SMA assembly pair to activate the NEG component; packaging the activated NEG component with the SMA component to form an NEG/SMA package having a gas tight seal; installing the NEG/SMA package in a vacuum device; and heating the installed NEG/SMA package such that the SMA component is actuated to expose the activated NEG component to a vacuum chamber in the vacuum device.

Example 2 includes the method of Example 1, wherein the NEG component includes an alloy material comprising zirconium-vanadium-iron, zirconium-cobalt-mischmetal, zirconium-aluminum, zirconium-vanadium-titanium-aluminum, or combinations thereof.

Example 3 includes the method of any of Examples 1-2, wherein the NEG component comprises a getter powder in tablet form, a getter powder attached or coated on a metal strip, a ring getter, or combinations thereof.

Example 4 includes the method of any of Examples 1-3, wherein the SMA component includes an alloy material comprising nickel-titanium-hafnium, nickel-titanium-zirconium, titanium-nickel-palladium, titanium-nickel-platinum, copper-aluminum-niobium, copper-aluminum-nickel, cobalt-aluminum, cobalt-nickel-aluminum, nickel-aluminum, nickel-manganese, nickel-manganese-gallium, zirconium-copper, titanium-niobium, uranium-niobium, titanium-palladium, titanium-gold, titanium-platinum-iridium, tantalum-ruthenium, niobium-ruthenium, or combinations thereof.

Example 5 includes the method of any of Examples 1-4, wherein the SMA component comprises a SMA foil, a SMA ring, a SMA wire, a SMA ribbon, a SMA strip, a SMA tube, or combinations thereof.

Example 6 includes the method of any of Examples 1-5, wherein the NEG component is coupled to the SMA component by a technique comprising soldering, brazing, using a vacuum adhesive, solid state welding, or combinations thereof.

Example 7 includes the method of any of Examples 1-6, wherein the NEG/SMA assembly pair is heated to a temperature from about 400° C. to about 950° C.

Example 8 includes the method of any of Examples 1-7, wherein the NEG/SMA assembly pair is heated in an oven, or by radio frequency induction.

Example 9 includes the method of any of Examples 1-8, wherein the activated NEG component is packaged with the SMA component in an inert atmosphere.

Example 10 includes the method of any of Examples 1-9, wherein the installed NEG/SMA package is heated to a temperature from about 100° C. to about 500° C.

Example 11 includes the method of any of Examples 1-10, wherein the installed NEG/SMA package is heated in an oven, or by radio frequency induction.

Example 12 includes the method of any of Examples 1-11, wherein the vacuum device is a vacuum electric device.

Example 13 includes the method of Example 12, wherein the vacuum electric device comprises a ring laser gyroscope, an electron microscope, an e-beam lithography device, a vacuum tube, or a metal vapor lamp.

Example 14 includes the method of any of Examples 1-13, wherein: the SMA component comprises a one-way SMA material that is in a martensite phase when coupled to the NEG component; and the SMA component is transformed to an austenite phase when the NEG/SMA assembly pair is heated to activate the NEG component.

Example 15 includes the method of Example 14, wherein the heated NEG/SMA assembly pair is cooled prior to packaging the activated NEG component with the SMA component, such that the SMA component is transformed from the austenite phase to the martensite phase.

Example 16 includes the method of Example 15, wherein the NEG/SMA package is formed by deforming or folding the SMA component around the activated NEG component, and sealing the SMA component with a sealant.

Example 17 includes the method of Example 16, wherein: the SMA component is transformed from the martensite phase back to the austenite phase when the installed NEG/SMA package is heated; and a strain induced when the martensite phase is transformed back to the austenite phase breaks the sealant to expose the activated NEG component.

Example 18 includes the method of any of Examples 1-17, wherein the NEG component comprises a NEG ring having a first diameter, and the SMA component comprises a SMA ring having a second diameter that is less than the first diameter.

Example 19 includes the method of Example 18, wherein: the NEG ring has a beveled inner surface coated with a getter material; and the SMA ring has a beveled outer surface configured to engage with the beveled inner surface of the NEG ring to seal the getter material and produce the NEG/SMA package.

Example 20 includes an assembly comprising: a vacuum electric device having a vacuum chamber; a sealed enclosure comprising a shape memory alloy (SMA) component, the sealed enclosure in the vacuum chamber, wherein an activated non-evaporable getter (NEG) component is coupled to the SMA component inside the sealed enclosure; wherein the sealed enclosure is configured to open when the SMA component is heated to an effective transformation temperature, such that the activated NEG component is exposed to the vacuum chamber.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
   coupling a non-evaporable getter (NEG) component to a shape memory alloy (SMA) component to form an NEG/SMA assembly pair;
   heating the NEG/SMA assembly pair to activate the NEG component;
   packaging the activated NEG component with the SMA component to form an NEG/SMA package having a gas tight seal;
   installing the NEG/SMA package in a vacuum device; and
   heating the installed NEG/SMA package such that the SMA component is actuated to expose the activated NEG component to a vacuum chamber in the vacuum device.

2. The method of claim 1, wherein the NEG component includes an alloy material comprising zirconium-vanadium-iron, zirconium-cobalt-mischmetal, zirconium-aluminum, zirconium-vanadium-titanium-aluminum, or combinations thereof.

3. The method of claim 1, wherein the NEG component comprises a getter powder in tablet form, a getter powder attached or coated on a metal strip, a ring getter, or combinations thereof.

4. The method of claim 1, wherein the SMA component includes an alloy material comprising nickel-titanium-hafnium, nickel-titanium-zirconium, titanium-nickel-palladium, titanium-nickel-platinum, copper-aluminum-niobium, copper-aluminum-nickel, cobalt-aluminum, cobalt-nickel-aluminum, nickel-aluminum, nickel-manganese, nickel-manganese-gallium, zirconium-copper, titanium-niobium, uranium-niobium, titanium-palladium, titanium-gold, titanium-platinum-iridium, tantalum-ruthenium, niobium-ruthenium, or combinations thereof.

5. The method of claim 1, wherein the SMA component comprises a SMA foil, a SMA ring, a SMA wire, a SMA ribbon, a SMA strip, a SMA tube, or combinations thereof.

6. The method of claim 1, wherein the NEG component is coupled to the SMA component by a technique comprising soldering, brazing, using a vacuum adhesive, solid state welding, or combinations thereof.

7. The method of claim 1, wherein the NEG/SMA assembly pair is heated to a temperature from about 400° C. to about 950° C.

8. The method of claim 1, wherein the NEG/SMA assembly pair is heated in an oven, or by radio frequency induction.

9. The method of claim 1, wherein the activated NEG component is packaged with the SMA component in an inert atmosphere.

10. The method of claim 1, wherein the installed NEG/SMA package is heated to a temperature from about 100° C. to about 500° C.

11. The method of claim 1, wherein the installed NEG/SMA package is heated in an oven, or by radio frequency induction.

12. The method of claim 1, wherein the vacuum device is a vacuum electric device.

13. The method of claim 12, wherein the vacuum electric device comprises a ring laser gyroscope, an electron microscope, an e-beam lithography device, a vacuum tube, or a metal vapor lamp.

14. The method of claim 1, wherein:
the SMA component comprises a one-way SMA material that is in a martensite phase when coupled to the NEG component; and
the SMA component is transformed to an austenite phase when the NEG/SMA assembly pair is heated to activate the NEG component.

15. The method of claim 14, wherein the heated NEG/SMA assembly pair is cooled prior to packaging the activated NEG component with the SMA component, such that the SMA component is transformed from the austenite phase to the martensite phase.

16. The method of claim 15, wherein the NEG/SMA package is formed by deforming or folding the SMA component around the activated NEG component, and sealing the SMA component with a sealant.

17. The method of claim 16, wherein:
the SMA component is transformed from the martensite phase back to the austenite phase when the installed NEG/SMA package is heated; and
a strain induced when the martensite phase is transformed back to the austenite phase breaks the sealant to expose the activated NEG component.

18. The method of claim 1, wherein the NEG component comprises a NEG ring having a first diameter, and the SMA component comprises a SMA ring having a second diameter that is less than the first diameter.

19. The method of claim 18, wherein:
the NEG ring has a beveled inner surface coated with a getter material; and
the SMA ring has a beveled outer surface configured to engage with the beveled inner surface of the NEG ring to seal the getter material and produce the NEG/SMA package.

20. An assembly comprising:
a vacuum electric device having a vacuum chamber;
a sealed enclosure comprising a shape memory alloy (SMA) component, the sealed enclosure in the vacuum chamber, wherein an activated non-evaporable getter (NEG) component is coupled to the SMA component inside the sealed enclosure;
wherein the sealed enclosure is configured to open when the SMA component is heated to an effective transformation temperature, such that the activated NEG component is exposed to the vacuum chamber.

* * * * *